US009104659B2

(12) United States Patent
Treadwell et al.

(10) Patent No.: US 9,104,659 B2
(45) Date of Patent: Aug. 11, 2015

(54) SYSTEMS AND METHODS FOR PROVIDING CONTENT AWARE DOCUMENT ANALYSIS AND MODIFICATION

(75) Inventors: William S. Treadwell, Richardson, TX (US); Casey A. Harris, McKinney, TX (US)

(73) Assignee: Bank of America Corporation, Charlotte, NC (US)

( * ) Notice: Subject to any disclaimer, the term of this patent is extended or adjusted under 35 U.S.C. 154(b) by 607 days.

(21) Appl. No.: 12/690,690

(22) Filed: Jan. 20, 2010

(65) Prior Publication Data

US 2011/0179352 A1    Jul. 21, 2011

(51) Int. Cl.
*G06F 17/22*   (2006.01)
*G06F 17/27*   (2006.01)
*G06F 17/24*   (2006.01)
*G06F 21/62*   (2013.01)

(52) U.S. Cl.
CPC .............. *G06F 17/277* (2013.01); *G06F 17/24* (2013.01); *G06F 21/6245* (2013.01); *G06F 2221/2101* (2013.01)

(58) Field of Classification Search
CPC ... G06F 21/6245; G06F 17/277; G06F 27/24; G06F 27/2775; G06F 27/306161; G06F 21/316; G06F 2221/2113; G06F 2221/2101; G06F 2221/2147
USPC .......... 715/255, 256, 259; 707/736, 748, 749, 707/754
See application file for complete search history.

(56) References Cited

U.S. PATENT DOCUMENTS

| | | | |
|---|---|---|---|
| 6,199,082 B1 | 3/2001 | Ferrel et al. | |
| 6,289,450 B1 * | 9/2001 | Pensak et al. | 713/167 |
| 6,920,564 B2 * | 7/2005 | Decuir | 713/189 |
| 7,120,868 B2 * | 10/2006 | Salesin et al. | 715/249 |
| 7,756,843 B1 * | 7/2010 | Palmer | 707/694 |
| 7,802,305 B1 * | 9/2010 | Leeds | 726/26 |
| 7,885,944 B1 * | 2/2011 | Bruening | 707/694 |

(Continued)

FOREIGN PATENT DOCUMENTS

WO    WO 2009/018328    2/2009

OTHER PUBLICATIONS http://msdn.microsoft.com/en-us/magazine/cc163839.aspx retreived on Sep. 12, 2008.

(Continued)

*Primary Examiner* — Wilson Tsui
(74) *Attorney, Agent, or Firm* — Weiss & Arons LLP; Michael A. Springs, Esq.

(57) ABSTRACT

Systems, methods and consumer-readable media for providing content-aware document analysis and modification are provided. A system for analyzing document content according to the invention may include a rules server that stores a set of expressions. Such expressions may define predetermined confidential information and/or patterns of confidential expressions. The system may further include a communication plugin that provides a platform for incorporating the set of confidential expression patterns as part of a document-producing application. Following incorporation of the communication plugin, an inline document monitor module according to the invention may form part of the document-producing application. The inline document monitor may monitor for the occurrence of at least one of the set of confidential expression patterns in a document.

28 Claims, 4 Drawing Sheets

(56) References Cited

U.S. PATENT DOCUMENTS

| | | | |
|---|---|---|---|
| 7,940,929 | B1 | 5/2011 | Sengupta |
| 8,141,159 | B2* | 3/2012 | Peled et al. .................... 726/26 |
| 8,560,833 | B2 | 10/2013 | Kumar et al. |
| 8,838,554 | B2 | 9/2014 | Treadwell et al. |
| 2001/0044886 | A1 | 11/2001 | Cassagnol et al. |
| 2002/0143827 | A1 | 10/2002 | Crandall |
| 2003/0051159 | A1 | 3/2003 | McCown et al. |
| 2003/0084339 | A1 | 5/2003 | Roginsky et al. |
| 2003/0115294 | A1 | 6/2003 | Hoang |
| 2003/0145017 | A1 | 7/2003 | Patton et al. |
| 2004/0010628 | A1 | 1/2004 | Gillam et al. |
| 2004/0179713 | A1* | 9/2004 | Tani et al. ................... 382/100 |
| 2005/0004922 | A1 | 1/2005 | Zernik |
| 2005/0044059 | A1 | 2/2005 | Samar |
| 2005/0138110 | A1 | 6/2005 | Redlich et al. |
| 2005/0264840 | A1* | 12/2005 | Niitsuma ................... 358/1.14 |
| 2006/0005017 | A1 | 1/2006 | Black et al. |
| 2006/0041751 | A1 | 2/2006 | Rogers et al. |
| 2006/0072785 | A1 | 4/2006 | Davidson et al. |
| 2006/0101047 | A1 | 5/2006 | Rice |
| 2007/0030528 | A1 | 2/2007 | Quaeler et al. |
| 2007/0073868 | A1 | 3/2007 | Nelson et al. |
| 2007/0094594 | A1 | 4/2007 | Matichuk et al. |
| 2007/0277240 | A1 | 11/2007 | Durfee et al. |
| 2008/0037065 | A1* | 2/2008 | Kawata ...................... 358/1.16 |
| 2008/0082618 | A1 | 4/2008 | Jones |
| 2008/0114819 | A1 | 5/2008 | Vom Scheidt et al. |
| 2008/0198421 | A1 | 8/2008 | Hirahara et al. |
| 2009/0037976 | A1 | 2/2009 | Teo et al. |
| 2009/0158423 | A1 | 6/2009 | Orlassino et al. |
| 2009/0178144 | A1 | 7/2009 | Redlich et al. |
| 2009/0210347 | A1 | 8/2009 | Sarcanin |
| 2009/0254572 | A1 | 10/2009 | Redlich et al. |
| 2010/0191613 | A1 | 7/2010 | Raleigh |
| 2010/0192212 | A1 | 7/2010 | Raleigh |
| 2010/0306850 | A1* | 12/2010 | Barile et al. .................... 726/25 |
| 2010/0313239 | A1* | 12/2010 | Chakra et al. ................... 726/2 |
| 2011/0030039 | A1 | 2/2011 | Bilange |
| 2011/0035783 | A1* | 2/2011 | Terasaki et al. .................. 726/1 |
| 2011/0179119 | A1 | 7/2011 | Penn |
| 2011/0179352 | A1 | 7/2011 | Treadwell et al. |
| 2012/0110320 | A1 | 5/2012 | Kumar et al. |
| 2012/0216242 | A1 | 8/2012 | Uner et al. |

OTHER PUBLICATIONS http://msdn.microsoft.com/en-us/library/aa159677(printer).aspx retreived on Sep. 12, 2008.
http://office.microsoft.com/en-us/word/HP030833041033.aspx retreived on Sep. 12, 2008.
http://office.microsoft.com/en-us/help/HA010347451033.aspx retreived on Sep. 12, 2008.
http://ezinearticles.com/?Smart-Tags-in-Microsoft-Office&id=1084575 retreived on Sep. 12, 2008.
http://www.nacgeo.com/nactag.asp retreived on Sep. 12, 2008.
http://support.microsoft.com/kb/262605 retreived on Sep. 12, 2008.
http://slashgeo.org/submit.pl?op=viewsub&subid=376&note=&title=NAC+Smart+Tag+Turns+Microsoft+Office+into+A+GIS retreived on Sep. 12, 2008.

Colin Wilcox et al. "Add Power to Word Searches With Regular Expressions", 1999, Microsoft Corporation. http://office.microsoft.com/en-us/help/HA010873051033.aspx [Accessed May 29, 2009].
Colin Wilcox et al, Putting Regular Expressions to Work in Word, 1999, Microsoft Corporation. http://office.microsoft.com/en-us/help/HA010873041033.aspx [Accessed May 29, 2009].
Ben Waldron, "Realizing the Potential of Office 2003 by Creating Smart Tags in Managed Code" (http://msdn.microsoft.com/en-us/magazine/cc163839.aspx), MSDN Magazine, Microsoft Corporation, Redmond, WA, Feb. 2005.
Jan Fransen, "Using Smart Tags with Research Services for the Microsoft Office System" (http://msdn.microsoft.com/en-us/library/aa159677(printer).aspx), MSDN Magazine, Microsoft Corporation, Redmond, WA, Dec. 2003.
"About Smart Tags" (http://office.microsoft.com/en-us/word/HP030833041033.aspx), Microsoft Corporation, Redmond, WA, Sep. 2008.
"Complete tasks quickly with Smart Tags in Office XP" (http://office.microsoft.com/en-us/help/HA010347451033.aspx), Microsoft Corporation, Redmond, WA, Jan. 6, 2010.
Claire Jarrett, "Smart Tags in Microsoft Office" (http://ezinearticles.com/?Smart-Tags-in-Microsoft-Office&id=1084575), EzineArticles.com, Green Bay, WI, Apr. 2008.
"NAC Smart Tag DLL That Turns Microsoft Office into Powerful Easy-To-Use GIS" (http://www.nacgeo.com/nactag.asp), NAC Geographic Products Inc., Toronto, Ontario, Canada, Jun. 28, 2009.
"The Microsoft Common Speller API (CSAPI) for Office Spell Checking" (http://support.microsoft.com/kb/262605), Microsoft Corporation, Redmond, WA, Jul. 2007.
Lixin Zhou, "NAC Smart Tag Turns Microsoft Office into A GIS" (http://slashgeo.org/submit.pl?op=viewsub&subid=376&note=&title=NAC+Smart+Tag+Turns+Microsoft+Office+into+A+GIS), Slashgeo.org, Brea, CA, Feb. 2007.
International Search Report for International Application PCT/US/11/21061, Feb. 28, 2011.
Dan Jurden, "Smart Tags in Office 2003" (http://www.code-magazine.com/Article.aspx?quickid=0302042), EPS Software, Spring, TX, Feb. 2006.
"OFFXP: How to Create a Microsoft Office Smart Tag List" (http://support.microsoft.com/kb/287698), Microsoft Corporation, Redmond, WA, Jan. 2007.
"Taceo Pro" (http://www.bestshareware.net/taceo.htm), Best Shareware, Jan. 14, 2006.
Non-Final Office Action for U.S. Appl. No. 12/033,139, Apr. 27, 2010.
Final Office Action for U.S. Appl. No. 12/033,139, Aug. 17, 2010.
Non-Final Office Action for U.S. Appl. No. 12/033,139, Oct. 3, 2011.
Final Office Action for U.S. Appl. No. 12/033,139, Mar. 6, 2012.
Non-Final Office Action for U.S. Appl. No. 12/033,139, Nov. 19, 2012.
Non-Final Office Action for U.S. Appl. No. 12/033,139, Jun. 17, 2013.
Final Office Action for U.S. Appl. No. 12/033,139, Feb. 10, 2014.
UK Intellectual Property Office Search Report for United Kingdom Patent Application No. 0902485.2, Jun. 4, 2009.
First Examination Report for Indian Patent Application No. 262/KOL/2009, Feb. 14, 2014.

* cited by examiner

US 9,104,659 B2

SYSTEMS AND METHODS FOR PROVIDING CONTENT AWARE DOCUMENT ANALYSIS AND MODIFICATION

FIELD OF TECHNOLOGY

Aspects of the disclosure relate to content-aware document modification.

BACKGROUND

Many corporate and personal computer users generate and edit documents in the course of their daily work. Many of these documents include content that is sensitive, confidential, restricted, and/or secret—i.e., forbidden to release.

Accordingly, it would be desirable to provide systems and methods to analyze such documents to determine whether the documents include content that is sensitive, confidential, restricted, and/or secret—i.e., forbidden to release.

SUMMARY OF THE INVENTION

It is an object of this invention to provide systems and methods to analyze such documents to determine whether the documents include content that is sensitive, confidential, and/or secret—i.e., forbidden to release. For the purposes of this application any expression that contains information that is any one of sensitive, confidential, and/or secret may be referred to in a generic sense as confidential.

Additional embodiments of the invention may include upon discovery of such limited access content, redacting the document or taking some other form of corrective action.

A method for analyzing a document based on the document content to determine whether confidential information is included in the document is provided. The method may include loading a set of rules into an appropriate document generating and/or editing application. The set of rules may define a set of confidential expression patterns. The defined set of expressions can include expressions that typically include confidential information. For example, the majority of the occurrences of the expression in the document, or the majority of the occurrences of the expressions in a predetermined historical sample, or expressions as predetermined by either a human or computer, may include confidential information.

The method may further include analyzing a document to determine the existence of one of the set of expression patterns in the document. In response to the detection of one of the defined set of expression patterns in the document, the method may display a visual indication of the detection of one of the defined set of expression patterns.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
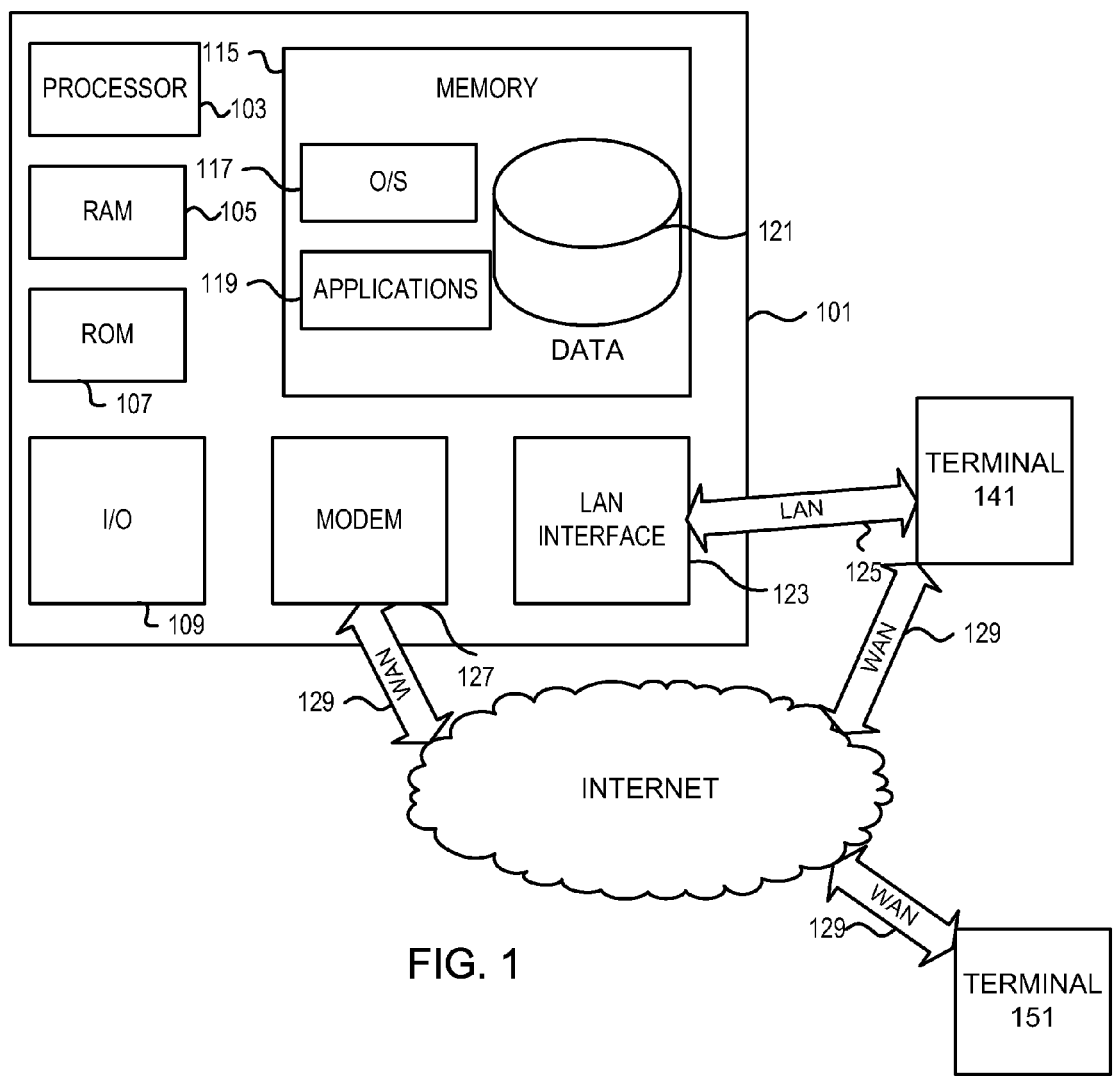
FIG. 1 illustrates a schematic diagram of a general-purpose digital computing environment in which one or more aspects of the present invention may be implemented.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage of account information and account holder information for the entire business, allowing interoperability between different elements of the business residing at different physical locations.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service ("SMS"), and voice input and speech recognition applications.

Computing device 101 and/or terminals 141 or 151 may also be mobile terminals including various other components, such as a battery, speaker, and antennas (not shown).

Systems and methods according to the invention provide content-aware document analysis and modification. When handling information, the document users involved often are not aware (or are not sufficiently reactive to the fact) that the information contained in the document is confidential, sensitive or proprietary. It would be advantageous to have a system according to the invention that periodically or substantially continually checks document content to determine whether the document includes patterns of information that typically include confidential, sensitive or proprietary information. In one embodiment, such a system could operate in a manner that is transparent to a user.

A system according to the invention can determine whether previously identified sensitive, confidential or secret information is found in a document, presentation, or spreadsheet. In certain embodiments of the invention, templates can be used to detect and change key factors such as color, graphics, and embedded characteristics of the identified sensitive and/or confidential information based on the previously identified sensitivity of information provided to the template.

The system according to the invention preferably provides a set of rules and/or templates that can be applied to documents to analyze and modify the document's content. Accordingly, unlike selecting a template that is for application to a static document, by using code or plugins that can detect when certain patterns of information is entered and alter the content as needed, the visible and invisible characteristics of a document can be changed.

Such a system preferably provides a mechanism for visible feedback to a user that the user has crossed a predetermined threshold of what should be recorded into a document. Such a threshold may be measured in terms of a certain level of appropriateness with respect to a particular document or other suitable criteria. Such criteria may include the number of occurrences of a social security number pattern and/or the discovery of restricted text pattern.

The process could also be extended to form an "appropriateness" rule which could be akin to, or, alternatively, implemented as a part of, grammar rules or spell checking. Such a process could provide a visible means to note that a document contains noticeable and/or unacceptable amounts or occurrences of patterns of confidential data.

An example of a platform for implementation of the invention could be a typical word processing suite such as Microsoft Office's WORD™. As the WORD users type or otherwise edit a document, the words and grammar, making up content, would be analyzed against specific "document sensitivity" rules. Such analysis could occur either locally, or at a central server. As content is entered into the document, the content can be compared, preferably in real-time or otherwise at some predetermined interval, to the rules governing the security of the document itself.

Figure 2:
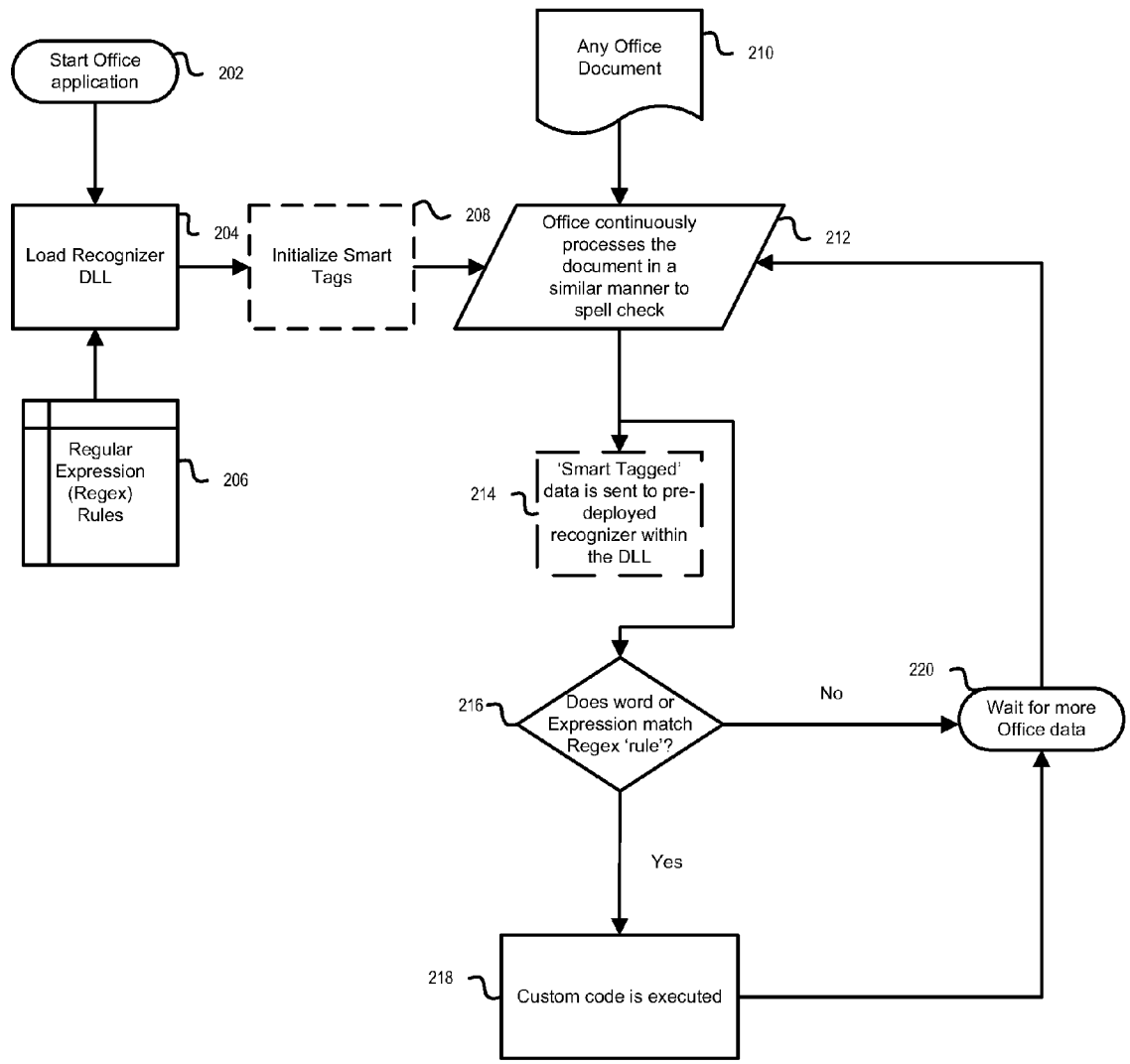
FIG. 2 shows an illustrative flow diagram of a process for implementing content-aware document analysis and modification.

If patterns of sensitive information are entered and/or otherwise detected, the system and/or process according to the invention can detect the patterns of sensitive information and the template could redact, highlight, or otherwise display a visual indication of the sensitive information pattern accordingly. FIG. 2 shows, at a high level, how the template process works.

FIG. 2 shows an illustrative flow diagram of a process for implementing content-aware document analysis and modification. Step 202 shows starting a selected Microsoft Office application (or other suitable document-based application). As part of the loading of the application, step 204 shows loading the recognizer dynamic link library ("DLL"). Such a library preferably includes, as shown in step 206, a set of "Regex" regular expression rules that dictate which expressions are considered sensitive. For example, one Regex rule could be that any time three numeric character are followed by a hyphen, then followed by two numeric characters then followed by a hyphen and an additional four numeric characters, the expression could be highlighted or otherwise visually indicated and/or otherwise indicated, such as by an audible alarm. Accordingly, an occurrence of a pattern such as "XXX-XX-XXXX", where the Xs signify a numeric character, could preferably trigger a reaction from the system.

Step 208 shows an optional step of initializing a "Smart Tags" process (or any other suitable text pattern identification software mechanism) within the greater process of analyzing document content and, where applicable, correcting or otherwise indicating the existence of such content pattern.

Smart Tags™, component of certain applications of Microsoft Office™ manufactured by Microsoft of Redmond, Wash., is a system that is currently available and known. Such a system preferably provides for the categorization and tagging of portions of and/or entire documents in a fashion that may be transparent to the document creator and/or editor. More specifically, Smart Tags relate to a mechanism that evaluates text in a document, either as the text is entered, as the text is edited, or as the text is on a screen, in order to identify a pattern and then run a rule set based on that pattern.

Conventional Smart Tags rules include placing a dotted underline of the identify pattern of text or phrase. In response to a "mouse-over" of the identified pattern, Smart Tags may display an information button to access what rule was triggered. Additionally, the mouse-over may offer possible actions to take.

Systems and methods according to the invention may operate as follows to provide additional functionality not found in conventional pattern recognition software mechanisms. First, as with conventional text pattern software mechanism operation, the text pattern software mechanism may continue to check text and identify patterns. Following an identification of a pre-determined pattern, systems and methods according to the invention may, instead of offering an information button and/or additional actions that may be taken following identification of a pattern, watermark, redact, and/or block printing or other utilities associated with the documents.

For example, in one embodiment of the invention, when a threshold is passed with respect to the Regex rules—e.g., a predetermined number of social security numbers are found in the document—then the document may be tagged as a sensitive document. One implementation of Smart Tags, or other suitable text pattern recognition software, may be to limit access, under certain conditions, to tagged documents—e.g., the tagged document may only be available when the person's laptop computer is docked at a predetermined docking station but not when the laptop computer is being used in a mobile computing mode.

It should be noted that systems and methods according to the invention are not limited to Smart Tags mechanisms but, rather, may be used with any system that can identify patterns in text.

Step 210 shows that, following loading of the rules and optional initialization of the Smart Tags system, the process according to the invention may continue with the creation of any Office Document. In one embodiment of the invention, the Office program (or other remotely administered program) can continuously check and further process the document with respect to the determination of whether sensitive information is found in the document, as shown in step 212. In certain embodiments of the invention, the Office program (or other externally administered program) can check the document periodically to determine whether sensitive information has been included in the document.

Step 214 shows that, under certain predetermined circumstances, the smart tagged data and/or documents can be sent to the pre-deployed recognizer within the DLL. Step 216 shows the process working, preferably side by side with the Smart Tagging, to determine whether a word or expression matches a pattern as included in a Regex rule as set forth in the Regex rules that have been loaded into the DLL.

Step 218 shows the execution of preferably custom code to display a visual indication of, and/or otherwise redact, the sensitive information that has been determined to exist in the document. Thereafter, as shown in step 220, or, alternatively, following a determination that the word or expression in the document did not match the Regex expression, the process may loop back to wait for more document data. Following the input of additional data, or, alternatively, the elapsing of a predetermined time period (not shown), the system may loop back to step 212 such that the Office application (or other suitable document editing and/or generating application) continues to check the document in a manner similar to the known continuous spell-checking and/or grammar checking algorithms.

This process according to the invention allows for dynamic configuration and provides the means for white-listing—i.e., authorizing as non-sensitive—document behavior and contents. The process could preferably extend to document characteristics such as document ownership, read/write access, content rules (i.e. sensitive information as defined by the pre-loaded Regex rules) as well as implementing document modifications. Such modifications may include but not be limited to adding watermarks to sensitive documents and/or redacting sensitive information.

As stated above, the method according to the invention may communicate via a plug-in to a suitable text pattern identification software mechanism. Such software may include, for example, Microsoft Office Suite™ (this may include applications such as, for example, WORD™, Excel™, and PowerPoint™).

The add-in according to the invention may preferably contain default rules making a communication service to an external rules providing application optional. In certain embodiments of the invention, the inline—i.e., operating substantially in real-time with the ongoing document creation and/or editing—document monitor add-in can recognize text patterns in a document. As such, the add-in can be "always on" and monitor substantially every keystroke by examining the syntactical typography for confidential information and/or expressions that correspond to patterns that typically include confidential information. The add-in can then check the input against the defined rules to determine whether matches to the Regex exist. If a match, or matches, is found, then action can be taken per the provided rules.

Figure 3:
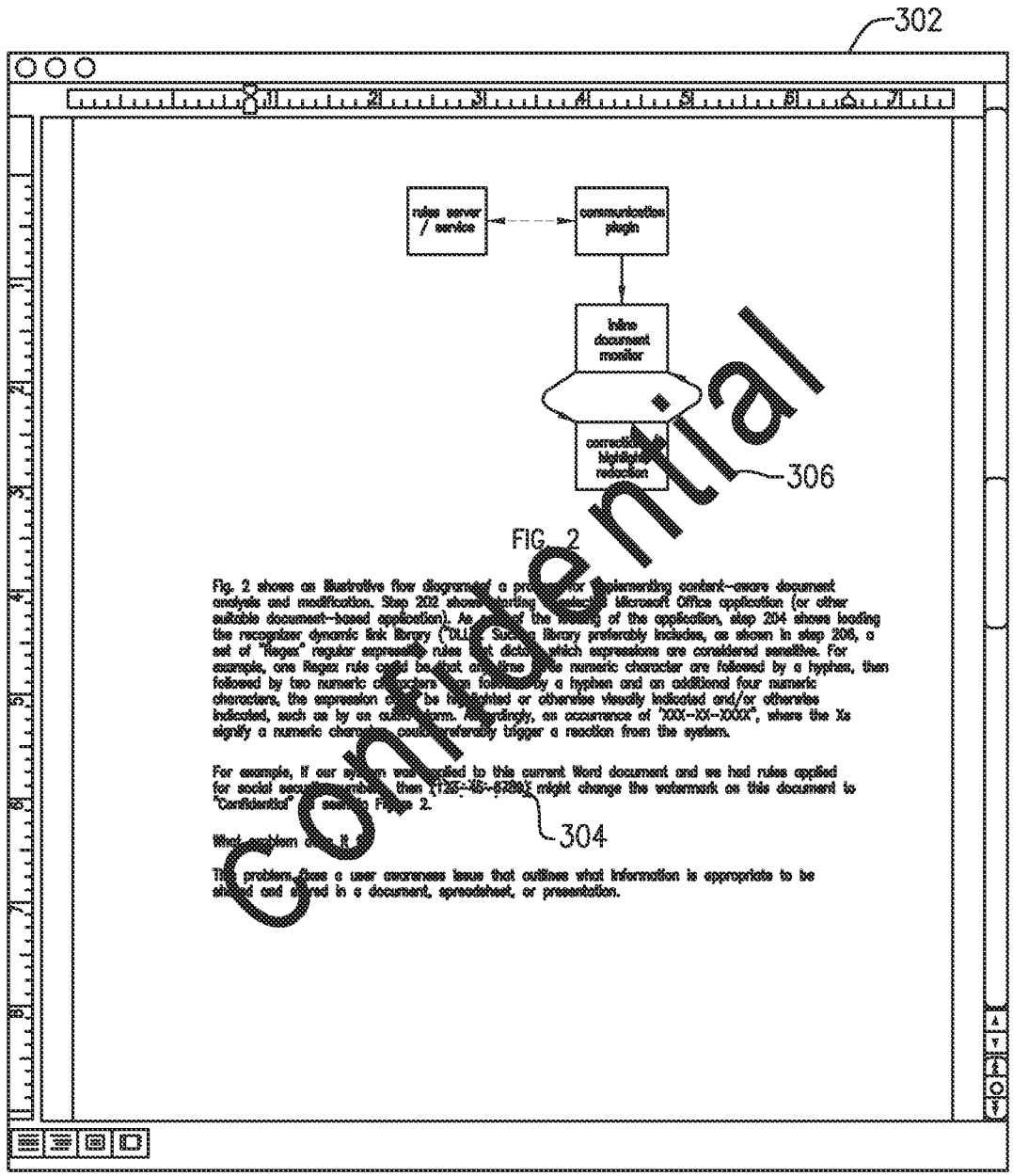
FIG. 3 shows a document with a preferably system-generated watermark.

FIG. 3 shows one example of the application of the process according to the invention to a Word document. FIG. 3 shows that page 302 is being analyzed. The process, as applied to a Word document, may preferably include a rule related to social security numbers. When the process determines that a word or other combination of characters, such as the occurrence of "123-45-6789", has been discovered in the document, then the process may preferably take a number of steps.

First, the process could highlight the sensitive information, as shown at 304. This could occur automatically, in a manner similar to the known automatic visual indication of a portion of text that reflects a web site in a document.

Second, the process could attach watermark 306 to the document which may describe the document as confidential. Alternatively, the process may, by some other mark, identify the document as sensitive in some other predetermined fashion.

Other rules according to the invention could implement other document security-enhancing procedures such as preventing the document and its contents from being saved, copied or printed. Another security-enhancing procedure according to the invention may include encrypting the document upon saving or other suitable measures. In certain embodiments of the invention, a hidden field may be embedded in the document such that the document itself is more easily identified by scanning technology. Preferably, such an embedded flag would enable document scanning technology to identify and perform actions on the document without being required to open the document itself.

The invention, as described herein, preferably alleviates a user awareness issue with respective to sensitive documents. Processes and systems according to the invention may outline the information that is appropriate to be shared and stored in a document, spreadsheet, or presentation. If information contained in the document contains restricted subject matter, the systems and methods according to the invention may either visually indicate the presence of such confidential material and/or take remedial measures to prevent the further distribution of such material.

The following is a more detailed description of the invention. On a first level of operation, the process according to the invention may create different templates based on document criticality, confidentiality, or sensitivity of content.

An example of such a first level of operation could be identification of a document that contains social security numbers and applying a watermark thereto. Such a template could be available to a user such that the user could select and define unique characteristics of the watermark such as color, font or style of watermark. Such a watermark could be detected using monitoring systems.

A second level of operation of the invention could possibly utilize a subsystem to select a template based on a review of the content entered into the document. Such a subsystem could change the surrounding template to most closely match the one for a given (or predetermined) level of confidentiality.

Figure 4:
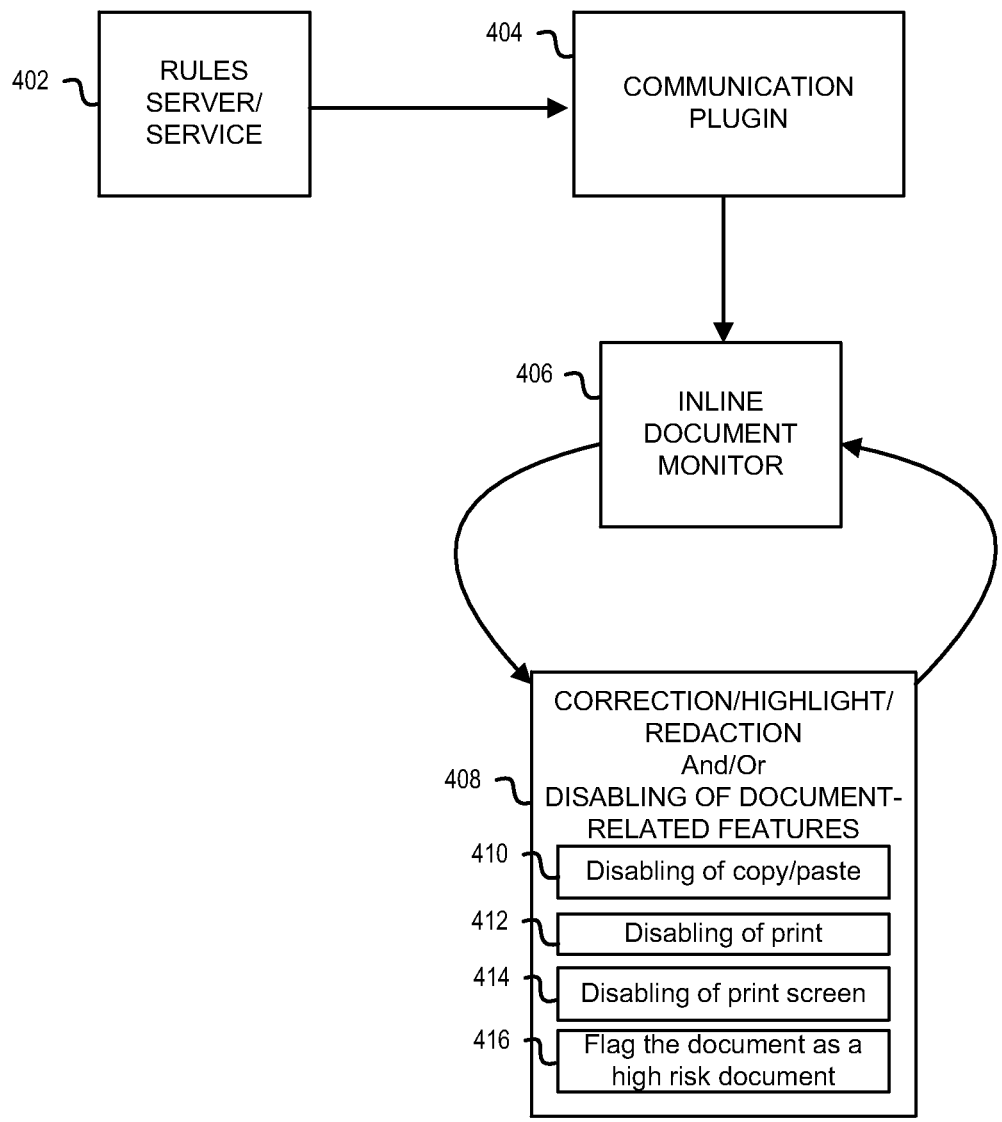
FIG. 4 shows another illustrative flow diagram of a more detailed process for implementing content-aware document analysis and modification.

FIG. 4 shows an overall framework within which the system can operate. The framework may include a rules server/service 402. The rules server may preferably implement the rules in the form of a communication plug-in 404. Plug-in 404 may preferably be adapted for use with a suitable document-based application. A plug-in is a computer program that interacts with a host application, such as a document generating and/or editing program, to provide a certain specific function. With respect to this application, the plug-in implements the rules that exist in the rules server.

When plug-in 404 is loaded into a suitable application, it may be used as an in-line document monitor 406. In-line document monitor 406 may be adapted to trigger and/or implement a number of corrective measures.

For example, inline document monitor 406 may trigger and/or implement such features as correction, highlighting redaction, and/or disabling of document-related features, as shown in 408. Such measures may more particularly include correcting the document by adding a watermark showing that the document is confidential. Such measures may also include highlighting or otherwise visually indicating that the document contains sensitive material. Additionally, such measures may include redacting the document to remove any sensitive material. Such disabling of document-related features may include disabling a copy/paste utility within the document 410, disabling a screen/print functionality to the local host 412 (preferably only while the document is in violation of the rule, though a continuing disablement pending a further user action may also be within the scope of the invention), disabling a print screen utility within the document 414, and/or flagging the document as a high risk document 416 (or as some other pre-determined class of document).

Some embodiments of the invention may also include adding a hidden field to the document itself. Such a field may preferably flag the document as a high risk document. Flagging as a high risk document may allow for faster processing by such monitoring tools as Vontu™, a software data protection product manufactured by Symantec of Mountain View, Calif., or other suitable monitoring tools.

Examples of such implementations may include a first scenario in which a user creates a presentation and the presentation (or other suitable document) contains no sensitive information or previously identified restricted content. In such a scenario, the template could maintain the current or initial state of the document.

In a second scenario, the user could create a presentation and enter social security numbers, personnel information, or pictures which are restricted from a predetermined class of documents—such as publicly available documents. The template and application may detect this content and make changes such as applying a red border to the document, applying a label—e.g., as a header or footer—of "confidential" to the document, and/or applying a watermark to the document.

In certain embodiments of the invention, such changes may be detectable by document monitoring systems according to the invention which could inspect for predefined changes prior to the document being exported from a host computer where the existence of the sensitive information was detected.

The applicable subsystems shown in FIG. 4 may further be described as follows. The rules server 402 may include a template subsystem. The template subsystem can contain different forms of the template and user-definable and/or system-set design variables such as size, color font, watermarks, and graphics. Such a subsystem can receive input from the other sub-systems (defined below) to alter the document.

The communication plug-in 404 may also incorporate a detection subsystem, as preferably further defined by rules server/service 402. Plug-in 404 (or other similarly suitable code) may detect restricted content as it is entered into the document creation and/or editing application.

In one embodiment of the invention, restricted content may also include content defined by the detection subsystem to include certain entity documents that have been put on a restricted list. Such documents may include certain high-priority or privileged entity documents such as secret recipes, other trade secrets, partnership agreements, entity by-laws, confidential e-mails or any other suitable document that an entity may desire to maintain in a restricted state.

In such an embodiment, the detection subsystem can be set to monitor all entity documents presently in use for the presence of even portions of such restricted documents. Accordingly, critical entity documents would be protected from unauthorized editing and/or distribution. Yet another embodiment of the invention along similar lines may include informing a central administrative division of the entity that editing and/or distribution of critical documents is occurring. Entities of all kinds may be appropriate candidates for implementing such systems and processes as described above. Such entities may include financial services entities, law firms, and any corporation that regularly deals with documents of sensitive and/or confidential nature.

A method or system according to the foregoing embodiment—i.e., the embodiment implementing sending information to a central administrative division—may also be used to prevent fraud within the entity and other crimes. For example, when the system identifies that a user is using bank account numbers in a pattern that suggests illegal transfer of funds, then the administrative division may be informed—preferably transparently to the alleged illegal transferor.

Yet another subsystem according to the invention may be a sensitive content or secret content subsystem. A signature or heuristic list may be used by this subsystem. The list may contain specific patterns of confidential expressions and/or entire confidential documents (each of the entire documents could be broken down further into sub-documents, some of which are sensitive and some of which are not) that could be updated with applicable information. Such a subsystem could further change the design of the document based on rules that may be included in this subsystem.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing content aware document analysis and modification according to the invention have been provided. Persons skilled in the art will appreciate that the present invention can be practiced by other than the described embodiments, which are presented for purposes of illustration rather than of limitation, and the present invention is limited only by the claims which follow.

What is claimed is:

1. A method for using an electronic processing platform for analyzing a document based on the document's content, the electronic processing platform comprising a document editing application, the method comprising:
   loading a set of rules into the document editing application, the set of rules defining a set of confidential expression patterns;
   analyzing the document to detect when one member of the set of confidential expression patterns occurs a threshold number of times in the document content;
   providing, in response to the detection of the threshold number of occurrences of the one member of the set of confidential expression patterns in the document content, visual feedback that the threshold number of the one member of the confidential expression patterns occurs in the document content by:
      visibly tagging each occurrence of the one member of the set of confidential expression patterns in the document content with a dotted underline;
      altering each occurrence of the one member of the set of confidential expression patterns in the document content such that in response to a mouse-over of any occurrence of the one member of the set of confidential expression patterns in the document content, the electronic platform:
         displays a button, the button for accessing a rule that defined one of the confidential expression patterns used to detect the occurrence that was moused-over; and
         offers one or more corrective actions applicable to the occurrence that was moused-over;
   disabling printing to a local or networked host, wherein the entirety of the document is prevented from being printed when the threshold number of occurrences of the one member of the set of confidential expression patterns are visually tagged; and
   embedding a hidden flag in the document such that the document itself is identified as confidential by document scanning software, wherein the embedded hidden flag identifies the document as confidential to the document scanning software without opening the document.

2. The method of claim 1 wherein the defined set of confidential expression patterns includes a pattern comprising three numeric characters followed by a hyphen followed by two numeric characters followed by a hyphen followed by four numeric characters.

3. The method of claim 1 wherein the defined set of confidential expression patterns includes a pattern comprising 9 numeric characters distributed over 11 character spaces.

4. The method of claim 1 further comprising, in response to the detection of the one member of the defined set of confidential expression patterns occurring in the document content, using the electronic processing platform to modify the occurrence of the detected one member expression pattern to comply with a predetermined format.

5. The method of claim 1 further comprising, in response to the detection of the one member of the defined set of confidential expression patterns occurring in the document content, using the electronic processing platform to modify the occurrence of the detected one member expression pattern to comply with a predetermined style.

6. The method of claim 1 further comprising, in response to the detection of the one member of the defined set of confidential expression patterns occurring in the document content, using the electronic processing platform to redact the occurrence of the detected one member expression.

7. The method of claim 6 further comprising using the electronic processing platform to redact the set of confidential expression patterns occurring in the document content according to a user-defined template.

8. The method of claim 6 further comprising using the electronic processing platform to redact the set of confidential expression patterns occurring in the document content according to a system-defined template.

9. The method of claim 1 wherein the analyzing the document occurs independent of document user knowledge.

10. The method of claim 1 further comprising, in response to the detection of the one member of the defined set of confidential expression patterns occurring in the document content, using the electronic processing platform to disable a copy/paste utility within the document.

11. The method of claim 1 further comprising, in response to the detection of the one member of the defined set of confidential expression patterns occurring in the document content, using the electronic processing platform to disable a print screen utility within the document.

12. The method of claim 1 further comprising, in response to the detection of the one member of the defined set of confidential expression patterns occurring in the document content, using the electronic processing platform to flag a high risk characteristic of the document.

13. The method of claim 12 wherein the high risk flagging occurs transparently to the user.

14. A method for analyzing a document based on the document's content, the method comprising:
   using a receiving module of a computer to receive a set of rules, the set of rules defining a set of confidential expressions;
   using an analyzing module of the computer to analyze the document content to determine when the document content exceeds a threshold number of occurrences of one member of the set of confidential expressions;
   using a display module, providing, in response to detecting the exceeding of the threshold number of occurrences of the one member of the set of confidential expressions-in the document content, visual feedback that the threshold number of occurrences has been detected in the document content by
   using a processing module to:
      visibly tag each occurrence of the of the one member of the set of confidential expressions in the document content with a dotted underline;

disable a copy/paste module within the computer, wherein the entirety of the document is prevented from being copied or pasted when the threshold number of occurrences of the one member of the set of confidential expressions are visibly tagged;

alter each occurrence of the one member of the set of confidential expressions in the document content such that in response to a mouse-over of any of the occurrence of the one member of the set of confidential expressions in the document content, using the processor module to:

display an information button, the button for accessing a rule that defined one of the confidential expressions used to detect the occurrence that was moused-over; and offer one or more corrective actions applicable to the occurrence that was moused-over; and embed a hidden flag in the document such that the document itself is identified as confidential by document scanning software, wherein the embedded hidden flag identifies the document as confidential to the document scanning software without opening the document.

15. The method of claim 14 further comprising, in response to the detection of the one member of the defined set of expressions occurring in the document, modifying the occurrence of the detected one member expression to comply with a predetermined format.

16. The method of claim 14 further comprising, in response to the detection of the one member of the defined set of expressions in the document, modifying the occurrence of the detected one member expression to comply with a predetermined style.

17. The method of claim 14 further comprising redacting the set of expressions occurring in the document according to a user-defined template.

18. The method of claim 14 further comprising redacting the set of expressions occurring in the document according to a system-defined template.

19. The method of claim 14 further comprising, in response to the detection of the one member of the defined set of confidential expression patterns occurring in the document, disabling a print module within the computer.

20. The method of claim 14 further comprising, in response to the detection of the one member of the defined set of confidential expression patterns occurring in the document, disabling a print screen module within the computer.

21. One or more non-transitory computer-readable media storing computer-executable instructions which, when executed by a processor on a computer system, perform a method for analyzing content of a document, the method comprising:

a rules server, having rules that comprise a set of expressions, said expressions that define predetermined confidential information;

a communication plugin that provides a platform for incorporating the set of expressions into a document-producing application;

a processor that detects when there is a threshold number of occurrences of confidential expression patterns in the content of the document;

a device configured to display, in response to the detecting of the threshold number of occurrences of confidential expression patterns in the document, visual feedback that the threshold number of occurrences of confidential expression patterns in the document has been detected; and an inline document monitor module that forms part of the document-producing application, and that is adapted to, in response to a detecting of the threshold number of occurrences of confidential expression patterns in the document:

visibly tag each occurrence of the confidential expression patterns in the content of the document with a dotted underline;

alter each occurrence of the confidential expression patterns in the content of the document such that in response to a mouse-over of any occurrence of the confidential expression patterns in the content of the document, the module:

displays an information button, the button for accessing rule that defined one of the confidential expression patterns used to detect the occurrence that was moused-over; and offers a corrective action applicable to the occurrence that was moused-over;

embed a hidden flag in the document such that the document itself is identified as confidential by document scanning software, wherein the embedded hidden flag identifies the document as confidential to the document scanning software without opening the document; and perform at least one of disabling a print mechanism for the entirety of the document, disabling a print screen mechanism for the entirety of the document, disabling a copy/paste mechanism for the entirety of the document and flagging the entirety of the document as a high risk document.

22. The media of claim 21, wherein, in the method, an inline document monitor is adapted to modify the set of expressions occurring in the document to comply with a predetermined format.

23. The media of claim 21, wherein, in the method, an inline document monitor is adapted to redact the set of expressions occurring in the document according to a user-defined template.

24. The media of claim 21, wherein, in the method, an inline document monitor is adapted to redact the set of expressions occurring in the document.

25. The media of claim 21, wherein, in the method, an inline document monitor is adapted to redact the set of expressions occurring in the document according to a system-defined template.

26. The media of claim 21, wherein, in the method, the monitoring of the content of the document by the inline document monitor is transparent to a user-awareness of the monitoring.

27. The media of claim 21, wherein, in the method, an inline document monitor is adapted to flag the document being analyzed upon detection of the occurrence of at least one of the set of expressions in a document.

28. One or more non-transitory computer-readable media storing computer-executable instructions which, when executed by a processor on a computer system, perform a method for analyzing a document based on the document's content, the analyzing using a set of rules that define a set of confidential expression patterns, the method comprising:

analyzing a document to determine the existence of confidential expression patterns in the document content;

detecting when there are a threshold number of occurrences of the confidential expression patterns in the document content;

and in response to detecting the threshold number of confidential expression patterns occurring in the document:
visibly tagging each occurrence of the confidential expression patterns in the document content with a dotted underline;
altering each occurrence of the confidential expression patterns in the document content such that in response to a mouse-over of any occurrence of the confidential expression patterns in the document content:
displaying an information button, the button for accessing a rule that defined one of the confidential expression patterns used to detect the occurrence that was moused-over; and
offering a corrective action applicable to the occurrence that was moused-over;
embedding a hidden flag in the document such that the document itself is identified as confidential by document scanning software, wherein the embedded hidden flag identifies the document as confidential to the document scanning software without opening the document; and
disabling printing to a local or networked host for the entirety of the document, disabling a print screen mechanism for the entirety of the document and disabling a copy/paste mechanism for the entirety of the document.

* * * * *